(12) United States Patent
Yiu et al.

(10) Patent No.: US 11,108,476 B2
(45) Date of Patent: Aug. 31, 2021

(54) TECHNIQUES IN BEAM MEASUREMENT

(71) Applicant: Intel Corporation, Santa Clara, CA (US)

(72) Inventors: Candy Yiu, Portland, OR (US); Jie Cui, Santa Clara, CA (US); Yang Tang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 16/163,004

(22) Filed: Oct. 17, 2018

(65) Prior Publication Data

US 2019/0052378 A1    Feb. 14, 2019

Related U.S. Application Data

(60) Provisional application No. 62/573,456, filed on Oct. 17, 2017.

(51) Int. Cl.

| | |
|---|---|
| *H04B 17/309* | (2015.01) |
| *H04B 7/06* | (2006.01) |
| *H04W 24/10* | (2009.01) |
| *H04W 72/04* | (2009.01) |
| *H04W 16/28* | (2009.01) |
| *H04W 8/22* | (2009.01) |

(Continued)

(52) U.S. Cl.
CPC ......... *H04B 17/309* (2015.01); *H04B 7/0617* (2013.01); *H04B 7/0695* (2013.01); *H04L 5/0048* (2013.01); *H04W 24/10* (2013.01); *H04W 72/046* (2013.01); *H04W 72/0453* (2013.01); *H04B 7/0626* (2013.01); *H04L 5/001* (2013.01); *H04W 8/22* (2013.01); *H04W 16/28* (2013.01); *H04W 24/00* (2013.01)

(58) Field of Classification Search
CPC combination set(s) only.
See application file for complete search history.

(56) References Cited

U.S. PATENT DOCUMENTS

| 10,411,940 B2 | 9/2019 | Ko et al. | |
|---|---|---|---|
| 2016/0183233 A1* | 6/2016 | Park ...................... | H04W 16/30 |
| | | | 370/331 |
| 2016/0262077 A1* | 9/2016 | Zhang ................... | H04W 24/08 |

(Continued)

OTHER PUBLICATIONS

3GPP, "Technical Specification Group Radio Access Network; NR; Physical layer procedures for control (Release 15)," 3GPP TS 38.213 V1.0.0 (Sep. 2017), 5G, 16 pages.

(Continued)

*Primary Examiner* — Yee F Lam
(74) *Attorney, Agent, or Firm* — Schwabe, Williamson & Wyatt, P.C.

(57) ABSTRACT

Embodiments of the present disclosure describe methods, apparatuses, storage media, and systems for beam management techniques in new radio (NR) applications. Various embodiments describe how to manage beam monitoring including measuring and reporting in an NR network efficiently so that a UE that is capable of measuring a minimum number of beams may report measurement results corresponding to a maximum number of beams. Such a beam management may take into consideration UE capability and network handling capacity to achieve effective and efficient NR communications. Other embodiments may be described and claimed.

16 Claims, 7 Drawing Sheets

(51) Int. Cl.
*H04W 24/00* (2009.01)
*H04L 5/00* (2006.01)

(56) References Cited

U.S. PATENT DOCUMENTS

| | | | | |
|---|---|---|---|---|
| 2016/0337916 | A1* | 11/2016 | Deenoo | H04W 36/0088 |
| 2016/0360463 | A1 | 12/2016 | Kim | |
| 2017/0078065 | A1* | 3/2017 | Nam | H04B 7/0469 |
| 2017/0295508 | A1* | 10/2017 | Stirling-Gallacher | |
| | | | | H04L 5/0048 |
| 2018/0027594 | A1* | 1/2018 | Nagaraja | H04B 7/0695 |
| | | | | 370/329 |
| 2018/0083688 | A1* | 3/2018 | Agiwal | H04W 12/0013 |
| 2018/0097596 | A1* | 4/2018 | Palanivelu | H04W 56/001 |
| 2018/0102826 | A1* | 4/2018 | Raghavan | H04B 7/088 |
| 2018/0123648 | A1* | 5/2018 | Nagaraja | H04B 17/15 |
| 2018/0146506 | A1* | 5/2018 | Zhang | H04L 5/0048 |
| 2018/0206170 | A1* | 7/2018 | Nagaraja | H04W 76/19 |
| 2018/0220360 | A1 | 8/2018 | Sheng et al. | |
| 2018/0234960 | A1 | 8/2018 | Nagaraja et al. | |
| 2018/0249453 | A1* | 8/2018 | Nagaraja | H04B 7/0634 |
| 2018/0295543 | A1* | 10/2018 | Gunnarsson | H04W 76/22 |
| 2018/0316404 | A1* | 11/2018 | Xu | H04L 5/0048 |
| 2018/0324721 | A1 | 11/2018 | Hakola et al. | |
| 2018/0324732 | A1 | 11/2018 | Park et al. | |
| 2019/0141659 | A1 | 5/2019 | Frenger et al. | |
| 2019/0182682 | A1* | 6/2019 | Kim | H04W 16/28 |
| 2019/0182884 | A1* | 6/2019 | Deenoo | H04W 68/005 |
| 2019/0229868 | A1* | 7/2019 | Siomina | H04L 5/0048 |
| 2019/0319686 | A1* | 10/2019 | Chen, IV | H04W 72/046 |
| 2019/0327629 | A1* | 10/2019 | Zhang | H04B 7/0626 |
| 2019/0394664 | A1* | 12/2019 | Sun | H04B 7/0408 |
| 2020/0014430 | A1* | 1/2020 | Zhang | H04L 5/0051 |
| 2020/0059290 | A1* | 2/2020 | Pan | H04B 7/0695 |
| 2020/0084735 | A1* | 3/2020 | Cheng | H04W 52/36 |
| 2020/0228266 | A1* | 7/2020 | Kim | H04B 7/0626 |
| 2020/0351638 | A1* | 11/2020 | Kim | H04L 5/0035 |

OTHER PUBLICATIONS

3GPP, "Technical Specification Group Radio Access Network; New Radio(NR); Requirements for support of radio resource management (Release 15)," 3GPP TS 38.133 V0.0.1 (May 2017), 5G, 14 pages.

Intel Corporation, "Draft of TS38.133 v0.0.1," 3GPP TSG-RAN WG4 Meeting #83, R4-1704696, Agenda item: 10.6.0, May 15-19, 2017, Hangzhou, China, 1 page.

3GPP, "Technical Specification Group Radio Access Network; NR; Radio Resource Control (RRC); Protocol specification (Release 15)," 3GPP TS 38.331 V0.1.0 (Oct. 2017), 5G, 42 pages.

International Patent Office—Notification Concerning Transmittal of International Preliminary Report on Patentability dated Jan. 9, 2020 from International Application No. PCT/US2018/039572, 11 pages.

3GPP, "Technical Specification Group Radio Access Network; Evolved Universal Terrestrial Radio Access (E-UTRA); User Equipment (UE) procedures in idle mode (Release 14)," 3GPP TS 36.304 V14.3.0 (Jun. 2017), Jun. 23, 2017, Lte Advanced Pro, 49 pages.

Mediatek Inc., "Offline Discussion Summary on Beam Recovery Mechanism Document for: Discussion," 3GPP TSG RAN WG1 Meeting #90, R1-1714771, Agenda Item: 6.1.2.2.7, Aug. 21-25, 2017, Prague, Czech, 2 pages.

Qualcomm et al., "WF on the use of SS-block for beam management," RAN1-90, R1-1715040, 6.1.2.2.4, Aug. 21-25, 2017, Prague, Czechia, 2 pages.

International Patent Office—International Search Report and Written Opinion dated Sep. 26, 2018 from International Application No. PCT/US2018/039572, 17 pages.

Mediatek Inc., "Neighbouring Cell Measurement Threshold for NR Mobility," 3GPP TSG-RAN WG2 Meeting #98, R2-1704528, Agenda Item: 10.4.1.4, May 15-19, 2017, Hangzhou, China, 2 pages.

CMCC, "Considerations on threshold for deriving cell quality," 3GPP TSG-RAN WG2 Meeting #98, R2-1705785, Agenda Item: 10.4.1.4, May 15-19, 2017, Hangzhou, China, 5 pages.

Sony, "RRM Measurements open issues," 3GPP TSG RAN WG2 Meeting #98, R2-1704832, Agenda Item: 10.4.1.3, May 15-19, 2017, Hangzhou, China, 7 pages.

United States Patent Office—Office Action dated Nov. 25, 2019 from U.S. Appl. No. 16/127,942, 23 pages.

* cited by examiner

TECHNIQUES IN BEAM MEASUREMENT

CROSS REFERENCE TO RELATED APPLICATION

The present application claims priority to U.S. Provisional Patent Application No. 62/573,456, filed Oct. 17, 2017, entitled "Beam Management Requirement," the entire disclosure of which is hereby incorporated by reference in its entirety.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

A user equipment (UE) of Long Term Evolution (LTE) is required to monitor and measure reference signals from a serving cell and neighbour cells at intra-frequency and inter-frequencies. However, new radio (NR) involves multiple radio frequency (RF) beams at both transmission and reception at both base station and UE side, especially in millimeter wave (mmWave) frequencies. Thus, the existing technologies may not be adequate in developing wireless networks. New solutions are needed in this regard.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
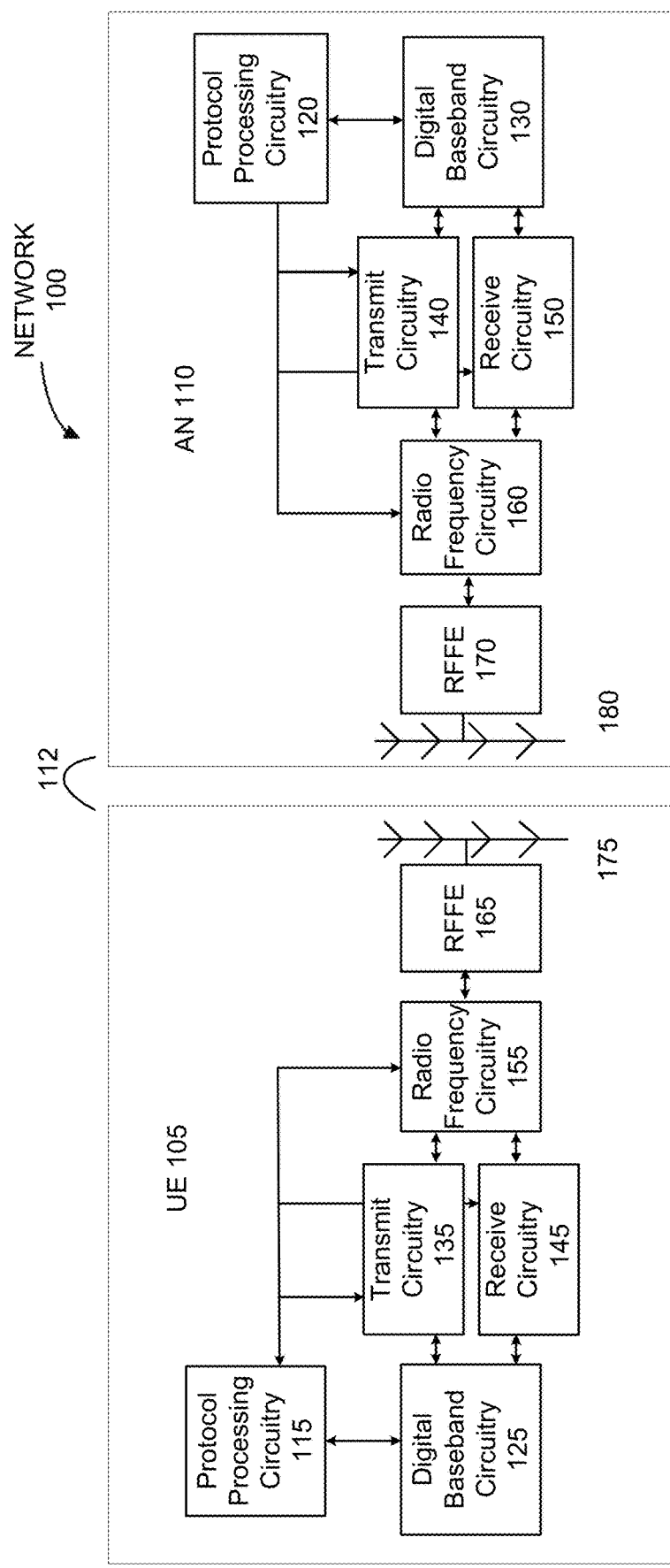
FIG. 1 schematically illustrates an example of a network comprising a user equipment (UE) and an access node (AN) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

In LTE communications, a UE may monitor reference signals transmitted by one or more ANs associated with one or more serving and nonserving cells in the network. The UE may monitor reference signals from at least eight cells per frequency. The monitoring of reference signals may be completed within a specified measurement period of time. Since there are no beamforming technologies implemented in LTE, the UE has been capable of monitoring the required reference signals from multiple cells. Fifth Generation (5G) NR wireless communication systems may operate in multiple frequency ranges including mmWave frequency ranges above 6 GHz, for example, NR Frequency Range 2 (FR2) from 24,250 MHz to 52,600 MHz. NR communications may implement beamforming technologies in either transmission or reception, or both, in a mmWave frequency range. For example, an AN associated with a cell in the network may be able to transmit with 64 beam configurations. Thus, the number of beams that the UE needs to monitor is significantly multiplied, considering the number of cells that the UE needs to monitor is unchanged or just slightly less. In addition, a UE of NR may conduct several measurements for monitoring, such as reference signal received power (RSRP), reference signal received quality (RSRQ), and signal to interference-and-noise ratio (SINR). A UE may also support multiple reference signals, such as NR synchronization signal (SS) and channel state information reference signal (CSI-RS). Therefore, the number of measurements that the UE of NR needs to conduct for monitoring could be substantially or overwhelmingly more than the UE of NR is capable of doing. It is challenging to monitor excessive amount of beams within a predetermined measurement period and it may overburden a serving cell to process such data, but such a situation does not occur in LTE communications due to the lack of beamforming technology and its implementations. In NR, new implementations are needed to accommodate this issue arising out of NR communications in mmWave.

Embodiments described herein may include, for example, apparatuses, methods, and storage media for implementing and configuring measurements of, or related to, NR beam measurements and reporting by a UE for beam monitoring while the UE may receive multiple beams from one or more cells in the network.

FIG. 1 schematically illustrates an example wireless network 100 (hereinafter "network 100") in accordance with various embodiments herein. The network 100 may include a UE 105 in wireless communication with an access node (AN) 110. In some embodiments, the network 100 may be a 5G NR network, a radio access network (RAN) of a third generation partnership project (3GPP) LTE network, such as evolved universal terrestrial radio access network (E-UTRAN), a NextGen RAN (NG RAN), or some other type of RAN. The UE 105 may be configured to connect, for example, to be communicatively coupled, with the AN 110. In this example, the connection 112 is illustrated as an air interface to enable communicative coupling, and can be consistent with cellular communications protocols such as a 5G NR protocol operating at mmWave and sub-mmWave, a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved NodeB (eNB), next Generation NodeB (gNB), RAN node, cell, serving cell, neighbour cell, and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

In some embodiments, a downlink resource grid can be used for downlink transmissions from the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARD) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (for example, aggregation level, L=1, 2, 4, or 8).

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to the above, each ECCE may correspond to nine sets of four physical resource elements known as enhanced resource element groups (EREGs). An ECCE may have other numbers of EREGs in some situations.

As shown in FIG. 1, the UE 105 may include millimeter wave communication circuitry grouped according to functions. The circuitry shown here is for illustrative purposes and the UE 105 may include other circuitry not shown here in FIG. 1. The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
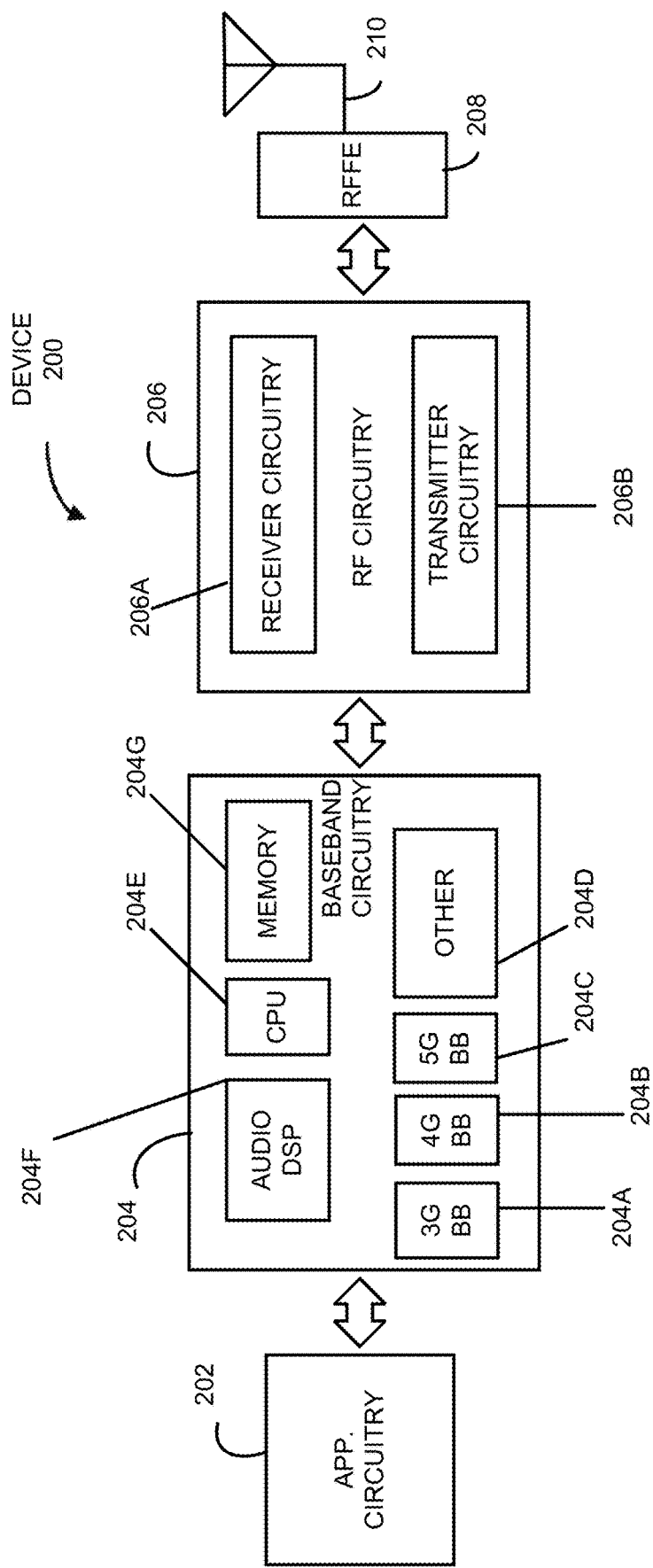
FIG. 2 illustrates example components of a device in accordance with various embodiments.
Figure 6:
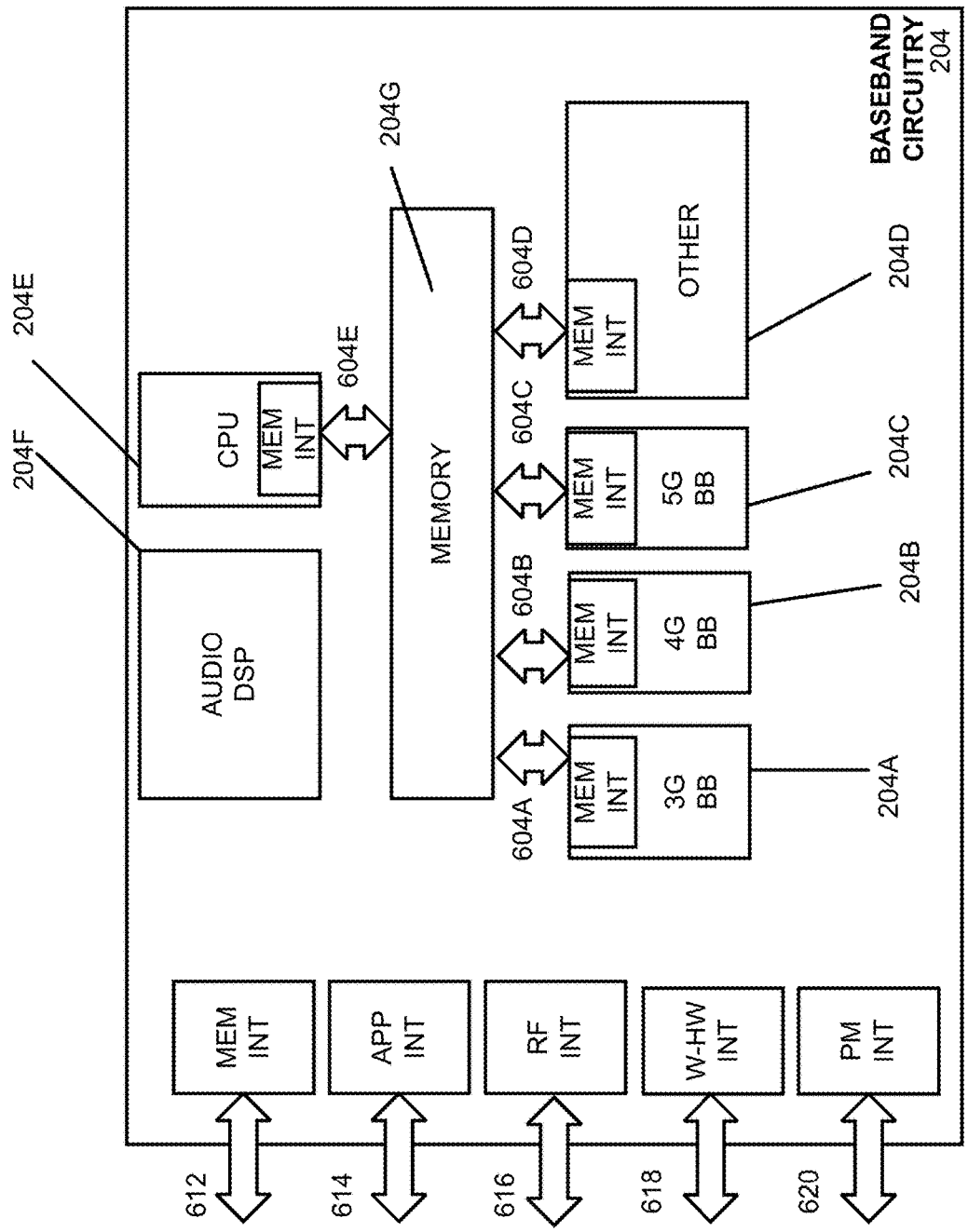
FIG. 6 illustrates example interfaces of baseband circuitry in accordance with some embodiments.

A UE reception may be established by and via the one or more antenna panels 175, RFFE 165, RF circuitry 155, receive circuitry 145, digital baseband circuitry 125, and the protocol processing circuitry 115. The one or more antenna panels 175 may receive a transmission from the AN 110 by receive-beamforming signals received by a plurality of antennas/antenna elements of the one or more antenna panels 175. Further details regarding the UE 105 architecture are illustrated in FIGS. 2, 3, and 6. The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and the one or more antenna panels 180. The one or more antenna panels 180 may transmit a signal by forming a transmit beam. FIG. 3 further illustrates details regarding the RFFE 170 and antenna panel 180.

FIG. 2 illustrates example components of a device 200 in accordance with some embodiments. In contrast to FIG. 1, FIG. 2 shows example components of the UE 105 or the AN 110 from a receiving and/or transmitting function point of view, and it may not include all of the components described in FIG. 1. In some embodiments, the device 200 may include application circuitry 202, baseband circuitry 204, RF circuitry 206, RFFE circuitry 208, and a plurality of antennas 210 together at least as shown. The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or an AN. In some embodiments, the device 200 may include fewer elements (for example, a cell may not utilize the application circuitry 202, and instead include a processor/controller to process IP data received from an evolved packet core (EPC)). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may be similar to and substantially interchangeable with the baseband circuitry 125 and the baseband circuitry 130 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

RFFE circuitry 208 may include a receive signal path, which may include circuitry configured to operate on RF beams received from one or more antennas 210. The RF beams may be transmit beams formed and transmitted by the AN 110 while operating in mmWave or sub-mmWave frequency rang. The RFFE circuitry 208 coupled with the one or more antennas 210 may receive the transmit beams and proceed them to the RF circuitry 206 for further processing. RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE 208, or in both the RF circuitry 206 and the RFFE 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

Figure 3B:
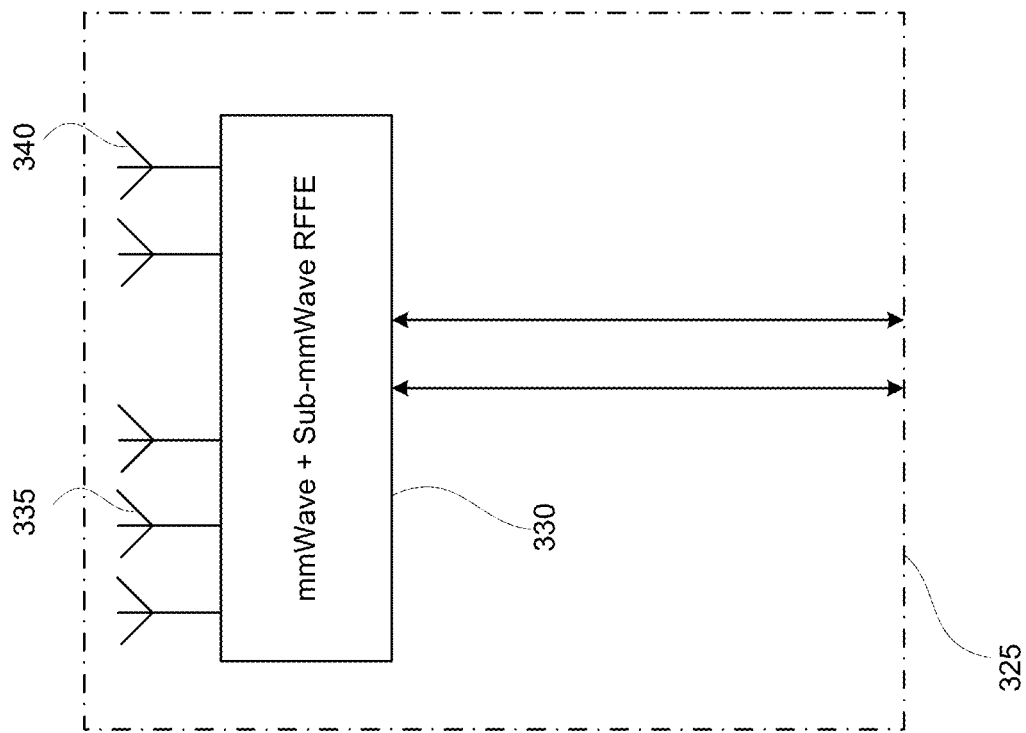
FIG. 3B illustrates an alternative RFFE in accordance with some embodiments.
Figure 3A:
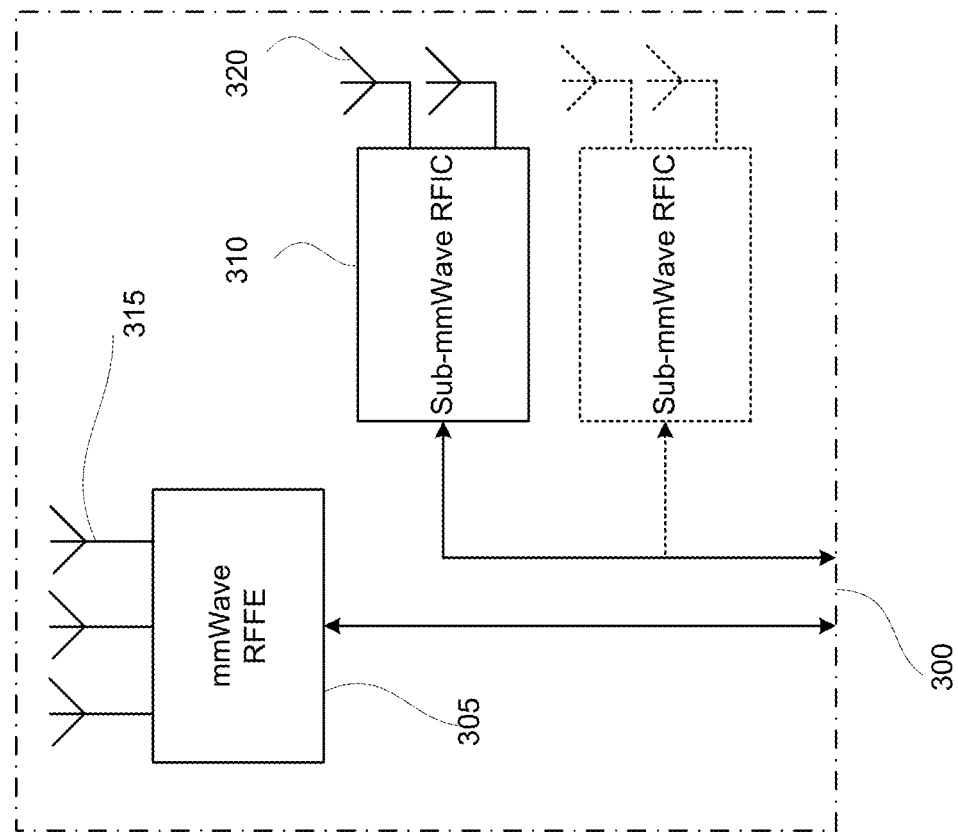
FIG. 3A illustrates a radio frequency front end (RFFE) incorporating a mmWave radio front end module and one or more sub-millimeter wave radio frequency integrated circuits in accordance with some embodiments.

FIG. 3A illustrates an embodiment of a radio frequency front end 300 incorporating a mmWave RFFE 305 and one or more sub-millimeter wave radio frequency integrated circuits (RFIC) 310. The RFFE 305 may be similar to and substantially interchangeable with the RFFE 165, RFFE 170, and/or the RFFE circuitry 208 in some embodiments.

In this embodiment, the one or more sub-mmWave RFICs 310 (or simply "RFICs 310") may be physically separated from the mmWave RFFE 305. RFICs 310 may include a connection to one or more antennas 320. The RFFE 305 may be coupled with multiple antennas 315, which may constitute one or more antenna panels.

FIG. 3B illustrates an alternate embodiment of a radio front end module 325. In this aspect both millimeter wave and sub-millimeter wave radio functions may be implemented in the same physical RFFE 330. The RFFE 330 may incorporate both millimeter wave antennas 335 and sub-millimeter wave antennas 340. The RFFE 330 may be similar to and substantially interchangeable with the RFFE 165, RFFE 170, and/or the RFFE circuitry 208 in some embodiments.

FIGS. 3A and 3B illustrate embodiments of various RFFE architectures for either the UE 105 or the AN 110.

In NR communications, an AN associated with a cell may utilize beamforming techniques to form transmit beams when transmitting signals to facilitate directional transmission to a UE at a particular location. This may be especially useful when operating at mmWave frequencies or sub-mmWave frequencies. The transmit beams from a cell with certain direction may provide the UE of a particular location with a stronger signal than other UEs of other locations. This may enable a better wireless connection between the UE and the AN associated with the cell. Multiple transmit beams from a cell may be formed by an antenna panel of the AN associated with the cell. For example, a maximum of 64 transmit beams may be formed with different transmit-beam configurations from a cell. Such transmit-beam configurations may utilize beamforming technology implemented by one or more antenna panels 180. Then, the transmit beams may be received and measured by the UE. In some embodiments, the UE may further form one or more receive beams while receiving.

Figure 4:
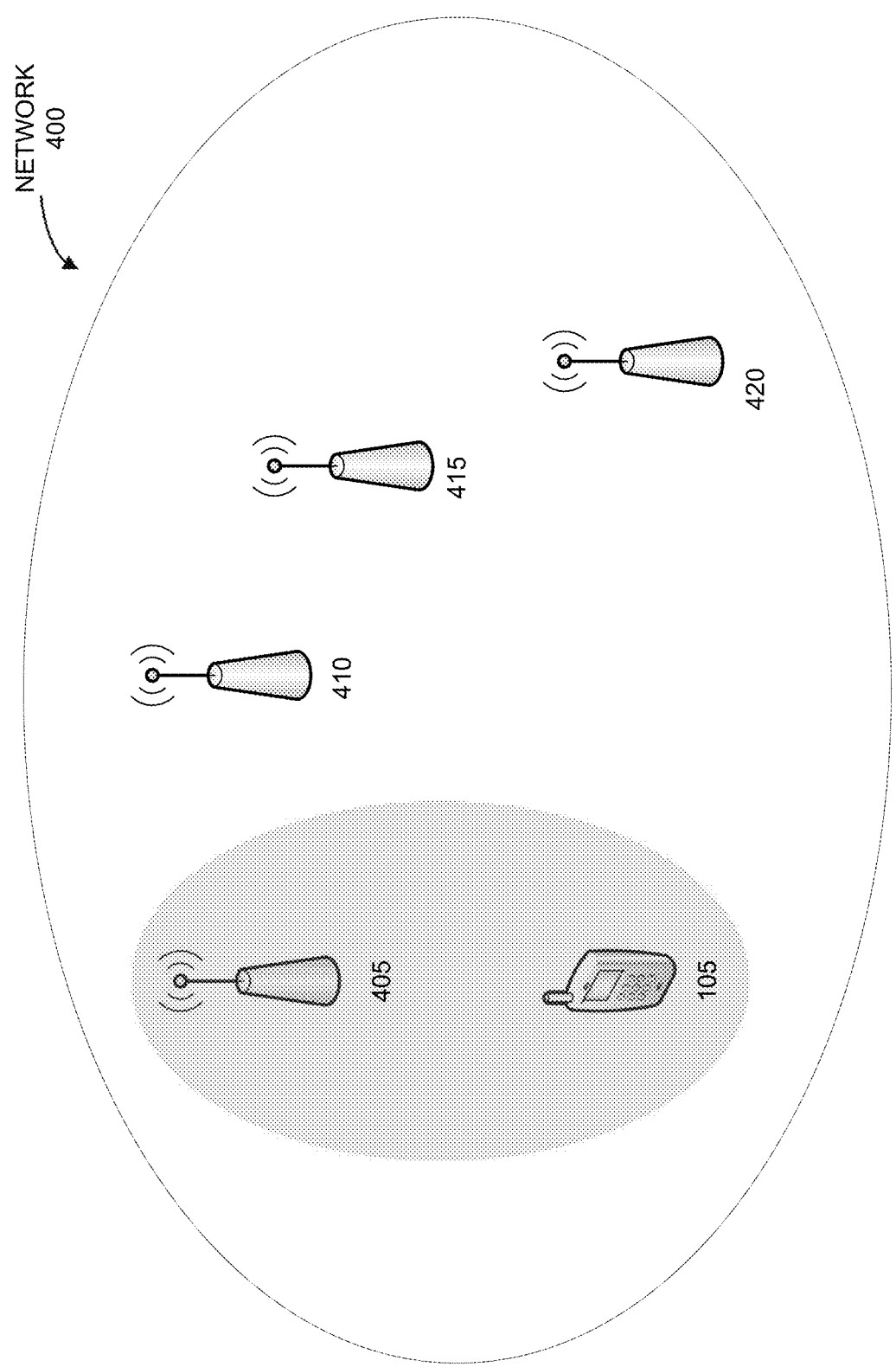
FIG. 4 illustrates an example of a network comprising a UE, an AN associated with a serving cell of the UE, and a number of ANs associated with nonserving cells in the network.

FIG. 4 illustrates a network 400, where the UE 105 may receive or detect beams from surrounding cells. For example, ANs 405, 410, 415, and/or 420 are associated with their corresponding cells. In some examples, the AN 405 may be associated with a serving cell of the UE 105 (hereinafter "AN associated with serving cell 405"), and the other ANs 410, 415, and 420 may be associated with nonserving cells of the UE 105 (hereinafter "ANs associated with nonserving cells 410, 415, and 420"). Any of the ANs described herein may be similar to and substantially interchangeable with the AN 110 in some embodiments. Each beam may include one or more reference signals. A reference signal (RS) may include an RS index to indicate certain beam information. The beam information may include, but is not limited to, pertinent transmitting cell identification, transmit-beam configuration, etc. The reference signals may be NR synchronization signals (SSs) and/or CSI-RS. An NR SS may include one or more SS blocks (SSBs) and an SSB may include an SSB index to indicate the pertinent beam information. The UE 105 may receive reference signals from either a serving cell or nonserving cell. It is noted that the UE 105 may receive reference signals or data signals on a serving carrier frequency, which is the carrier frequency used by the UE 105 and the serving cell under RRC-CONNECTED status. When a reference signal has the same carrier frequency as the serving carrier frequency, it is referred to as an intra-frequency. Otherwise, when the reference signal has a carrier frequency other than the serving carrier frequency, it is referred to as an inter-frequency. There may be a plurality of nonserving cells more than FIG. 4 illustrates in a network.

As discussed above, the UE 105 may need to monitor reference signals from those nonserving cells in the network. As the UE 105 may be required to monitor at least a minimum number of cells and an AN associated with each cell may transmit up to 64 different beams, it may not be practical or even possible for the UE 105 to monitor all of the beams received by the UE 105, when monitoring a beam may include measurements of RSRP, RSRQ, and SINR regarding the NR SS and CSI-RS of the beam. In addition, such massive measurements and pertinent reporting to the AN associated with serving cell 405 may excessively burden the network and the AN associated with serving cell 405. Embodiments described herein may include, for example, apparatuses, methods, and storage media for implementing and configuring measurements of, or related to, NR beam measurements and reporting for beam monitoring while the UE may receive multiple beams from one or more cells in the network.

Figures 5A, 5B:
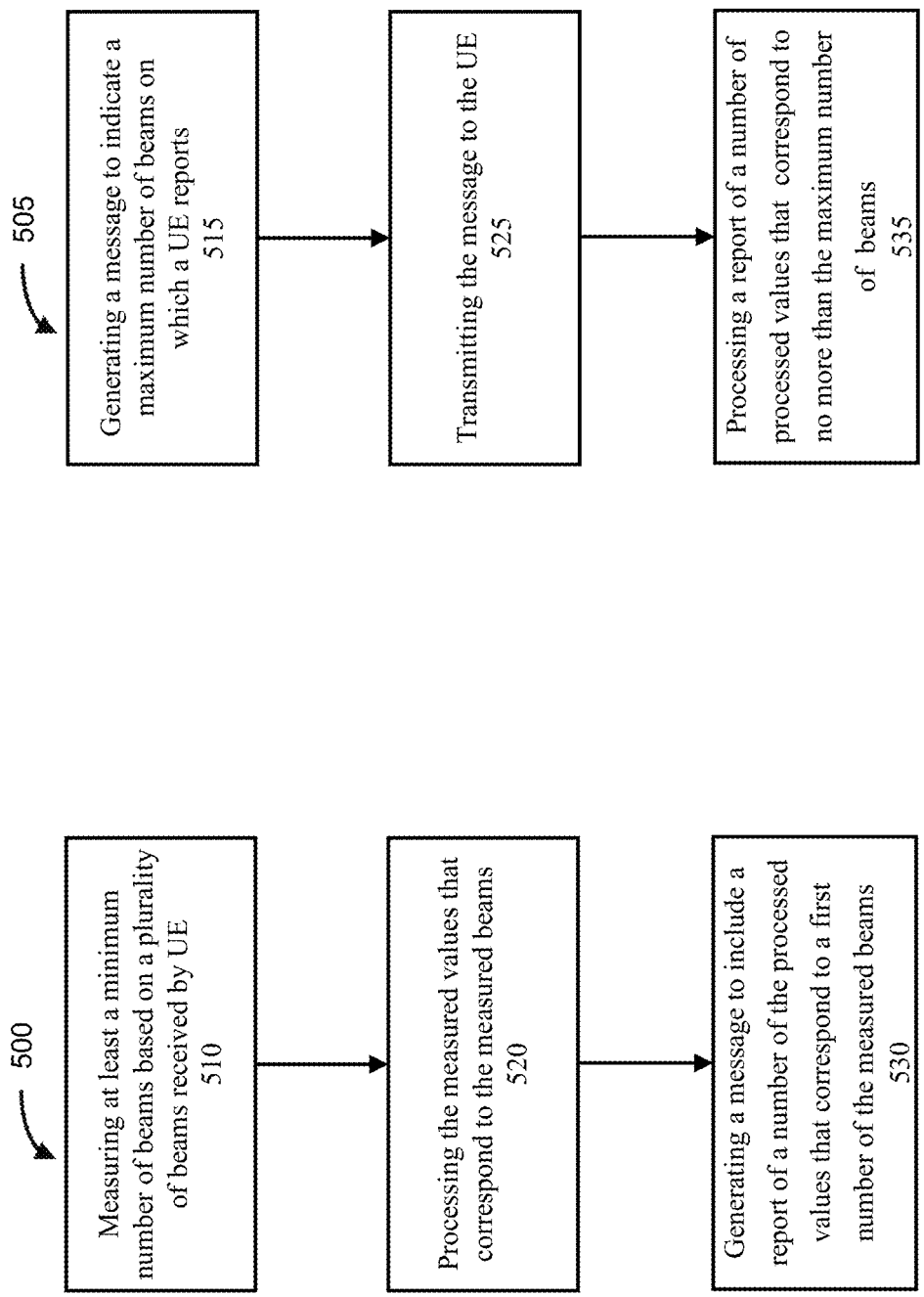
FIG. 5A illustrates an operation flow/algorithmic structure to facilitate a process of beam monitoring by a UE in accordance with some embodiments.
FIG. 5B illustrates an operation flow/algorithmic structure to facilitate the process of beam monitoring by an AN associated with a serving cell in accordance with some embodiments.

FIG. 5A illustrates an operation flow/algorithmic structure 500 to facilitate a process of beam monitoring by the UE 105 in accordance with some embodiments. The operation flow/algorithmic structure 500 may be performed by the UE 105 or circuitry thereof. The beam monitoring may refer to beam measuring. In addition, the beam monitoring may include reporting measurements. In some embodiments, beam monitoring may also include beam detecting.

The operation flow/algorithmic structure 500 may include, at 510, measuring at least a minimum number of beams based on a plurality of beams received by the UE 105. The plurality of beams may be formed and transmitted by the AN associated with serving cell 405, or one or more of the ANs associated with nonserving cells 410, 415, and 420 in mmWave and/or sub-mmWave operations. Those beams may carry reference signals of, but not limited to, NR SS and CSI-RS. The reference signals may include RS indexes. An RS index may include information to indicate cell identification, transmit-beam configuration, and other information defining or distinguishing the corresponding beam. For example, an NR SS may include one or more SS blocks, and each SS block may carry an SSB index, which corresponds to a specific beam formed and transmitted by a cell. An SSB index information may be carried by physical broadcast channel (PBCH). The SSB index information may be carried by PBCH demodulation reference signal (DMRS) alone, or PBCH-DMRS and PBCH payload together. Thus, a beam may be represented or identified by an RS index or SSB index. A UE may support at least NR SS and CSI-RS for radio resource management (RRM) measurement in NR.

The UE 105 may receive a plurality of the beams from both serving cell and nonserving cells in the network. Some of the beams may be intra-frequency beams to the UE 105, which means those beams are configured with the same serving carrier frequency of UE 105. The intra-frequency beams may be from a serving cell or nonserving cells in the network. Some other beams may be inter-frequency beams to the UE 105, which means those beams are configured with carrier frequencies other than the serving carrier frequency of UE 105. Similarly, the inter-frequency beams may be from a serving cell or nonserving cells. In some embodiments, a UE monitoring capability regarding monitoring beams from a serving cell may only concern the beams of other serving carrier frequencies in the same band of the serving carrier frequency.

The minimum number of beams may indicate a UE monitoring capability. This minimum number may require a UE capable of monitoring a minimum number of beams.

The minimum number of beams may be identified by a minimum number of RS indexes, wherein the RS indexes may hold a minimum number of different values corresponding to the minimum number of beams. In some embodiments, the minimum number of beams may concern intra-frequency beams that are configured with the same serving carrier frequency. Further, those beams that are on the same serving carrier frequency may be from one or more cells in the network. In some embodiments, the one or more cells may be nonserving cells.

In some other embodiments, the minimum number of beams may concern inter-frequency beams that are configured with other carrier frequencies in the same band rather than the serving carrier frequency. In this scenario, the UE capability may only concern the beams that are from the serving cell. In other embodiments, the UE capability may concern the beams from nonserving cells in alteration or addition.

In some embodiments, the minimum number of beams may indicate a minimum number of beams that the UE 105 is capable of measuring per cell, per radio access technology (RAT), per frequency range (for example per high frequency or per low frequency), or in total number, alone or any combination thereof. Alternatively and additionally, a maximum number of beams may be used to indicate a maximum number of beams that the UE 105 is capable of measuring per cell, per radio access technology (RAT), per frequency range (for example, per high frequency or per low frequency), or in total number, alone or any combination thereof.

In some embodiments, the UE 105 may receive a less number of beams than the minimum number of beams prescribed herein. Under such a situation, all of the received beams may be measured regardless of the minimum number of beams.

In some embodiments, the measurements may be conducted within a specified measurement period. For example, a Layer 1 measurement period may be specified for the UE 105 to monitor beams configured with intra-frequency.

In some embodiments, the measurements may include beam quality measurements and beam identification detection. The beam quality measurements may include RSRP, RSRQ, SINR, and/or other adequate beam measurements with respect to the reference signals. When the reference signals are NR SS, the measurements may be SS-RSRP, SS-RSRQ and/or SS-SINR. The beam identification detection may include detecting RS indexes, SSB indexes, or CSI-RS indexes based on the type of the reference signals that the UE 105 receives.

The operation flow/algorithmic structure 500 may further include, at 520, processing the measured values that correspond to the measured beams. In some embodiments, the UE 105 may apply Layer 1 and/or Layer 3 filters on the measured values to derive corresponding processed values. The measured values and processed values may include measurement quantities of RSRP, RSRQ, and/or SINR. In some embodiments, the measurement values may further include beam identifications, based on RS indexes including SSB indexes and CSI-RS indexes. In some embodiments, the measurement values may include beam identifications only but no measurement quantities. The number of beams that are measured by the UE 105 may be equal to, or larger than, the minimum number of beams discussed in the operation flow at 510.

The operation flow/algorithmic structure 500 may further include, at 530, generating a message to include a report of a number of processed values that correspond to a first number of the measured beams. The UE 105 may generate a report to include the processed values based on the measurement at 510 and the processing at 520. The processed values to be reported may include beam identification information and/or various measurement quantities, such as RSRP, RSRQ and SINR. The first number may have an upper bound to indicate a maximum number of beams, the measurements of which the UE 105 may report. Such a maximum number may be configured by the AN associated with serving cell 405 in a control element. In some embodiments, the maximum number may refer to a maximum number of RS indexes, SSB indexes, or CSI-RS indexes, depending on the types of reference signals carried by the beams. The UE 105 may specify the maximum number of beams on which to report based on an information element configured by the AN associated with serving cell 405. To limit the maximum number of beams on which the UE 105 may report in a UE monitoring activity may increase UE efficiency, serving cell efficiency, and network efficiency.

In some embodiments, the specified maximum number of beams on which to report may be smaller than the number of beams that are measured by the UE 105. Thus, the UE 105 may restrict the reported values to the ones corresponding to the maximum number of beams. In contrast, if the specified maximum number of beams on which to report is greater than the number of beams that are measured by the UE 105, the UE 105 may report measured values corresponding to the number of beams that are measured by the UE 105. It is noted that the number of beams to be measured or measured may not be affected by the specified maximum number of beams.

In some embodiments, the maximum number of beams may indicate a maximum number of beams on which the UE 105 may report per cell, per RAT, per frequency range, or in total number, alone or in any combination thereof. Alternatively or additionally, a minimum number of beams may be used to indicate a minimum number of beams on which the UE 105 may report per cell, per RAT, per frequency range, or in total number, alone or in any combination thereof.

FIG. 5B illustrates an operation flow/algorithmic structure 505 to facilitate the process of beam monitoring by the AN associated with serving cell 405 in accordance with some embodiments. The operation flow/algorithmic structure 505 may be performed by the AN 110 or circuitry thereof.

The operation flow/algorithmic structure 505 may include, at 515, generating a message to indicate a maximum number of beams to measure or on which a UE is to report. Such a maximum number may be configured by the AN associated with serving cell 405 in a control element. In some embodiments, the maximum number may refer to a maximum number of RS indexes, SSB indexes, or CSI-RS indexes, depending on the reference signals carried by the beams.

The operation flow/algorithmic structure 505 may further include, at 525, transmitting the message to the UE. The UE 105 may determine the maximum number of beams to measure or on which to report based on an information element configured in the message.

The operation flow/algorithmic structure 505 may further include, at 535, processing a report of a number of processed values that correspond to no more than the maximum number of beams. The report may be generated and transmitted by the UE 105.

In addition, the AN associated with serving cell 405 may generate a plurality of beams that include reference signals configured with carrier frequencies other than serving carrier frequency so that the UE 105 may monitor those beams. In some embodiments, those carrier frequencies other than the serving carrier frequency are in the same band of the serving carrier frequency.

In some embodiments, the AN associated with serving cell 405 may configure a minimum number of beams that the UE 105 needs to monitor. The to-be-monitored beams may be transmitted by other cells in the network than the AN associated with serving cell 405 and configured with the serving carrier frequency. In some embodiments, the to-be-monitored beams may be transmitted by the AN associated with serving cell 405 and configured with other carrier frequencies in the same band as the serving carrier frequency.

FIG. 6 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 604A-604E, respectively, to send/receive data to/from the memory 204G.

The baseband circuitry 204 may further include one or more interfaces to communicatively couple to other circuitries/devices, such as a memory interface 612 (for example, an interface to send/receive data to/from memory external to the baseband circuitry 204), an application circuitry interface 614 (for example, an interface to send/receive data to/from the application circuitry 202 of FIG. 2), an RF circuitry interface 616 (for example, an interface to send/receive data to/from RF circuitry 206 of FIG. 2), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals).

Figure 7:
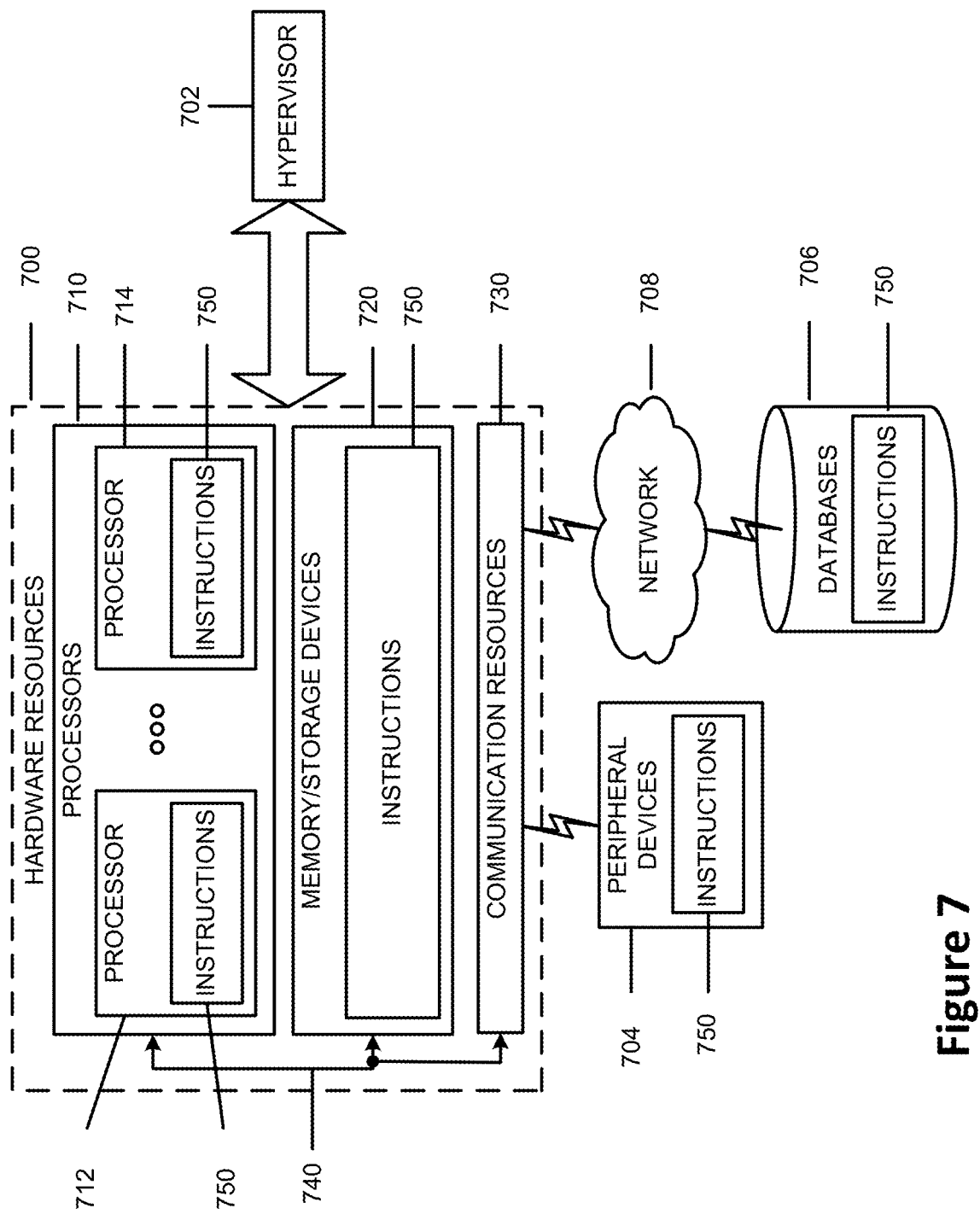
FIG. 7 illustrates hardware resources in accordance with some embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. For example, in an embodiment in which the hardware resources 700 are implemented into the UE 105, the instructions 750 may cause the UE to perform some or all of the operation flow/algorithmic structure 500. In other embodiments, the hardware resources 700 may be implemented into the AN 110. The instructions 750 may cause the AN 110 to perform some or all of the operation flow/algorithmic structure 500. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting Examples of various embodiments are provided below.

Example 1 may include one or more non-transitory computer-readable media (NTCRM) comprising instructions to, upon execution of the instructions by one or more processors of a UE, cause the UE to: measure, based on reception of a plurality of beams, at least a minimum number of beams of the plurality of beams; process, based on the measurements of the at least minimum number of beams, measured values that correspond to the measured beams; and generate, based on the processed values, a message to include a report of a number of the processed values that correspond to a first number of the measured beams.

Example 2 may include the one or more NTCRM of example 1 and/or some other example herein, wherein to measure the at least the minimum number of beams is to measure reference signals of the at least the minimum number of beams and each reference signal (RS) of the reference signals carries a specific RS index to indicate a specific beam of the at least the minimum number of beams.

Example 3 may include the one or more NTCRM of example 2 and/or some other example herein, wherein the reference signals include new radio synchronization signals (NR SSs) and each NR SS of the NR SSs includes one or more synchronization signal blocks (SSBs) with a specific SSB index that indicates a specific beam of the at least the minimum number of beams.

Example 4 may include the one or more NTCRM of example 2 and/or some other example herein, wherein the reference signals include channel state information reference signals (CSI-RSs) and each CSI-RS of the CSI-RSs includes a CSI-RS index that indicates a specific beam of the at least the minimum number of beams.

Example 5 may include the one or more NTCRM of example 1 and/or some other example herein, wherein the minimum number of beams indicates a minimum number of beams that the UE is capable of measuring and the at least the minimum number of beams are configured on a serving carrier frequency of the UE.

Example 6 may include the one or more NTCRM of example 5 and/or some other example herein, wherein the at least the minimum number of beams are transmitted by one or more access nodes (ANs) associated with one or more cells.

Example 7 may include the one or more NTCRM of example 1 and/or some other example herein, wherein the at least the minimum number of beams are transmitted by an access node (AN) associated with a serving cell and are configured with carrier frequencies other than a serving carrier frequency of the UE in a same band of the serving carrier frequency, further wherein the minimum number of beams indicate a minimum number of beams that the UE is capable of measuring.

Example 8 may include the one or more NTCRM of example 1 and/or some other example herein, wherein the first number has an upper bound to indicate a maximum number of beams, to which the processed values correspond are to be reported.

Example 9 may include the one or more NTCRM of example 8 and/or some other example herein, wherein, upon execution, the instructions further cause the UE to determine the maximum number of beams based on a received message from an access node (AN) associated with a serving cell that includes information to indicate the maximum number of beams.

Example 10 may include the one or more NTCRM of example 1 and/or some other example herein, wherein the measurement is to measure reference signal received power (RSRP), reference signal received quality (RSRQ), or signal to interference-and-noise ratio (SINR).

Example 11 may include the one or more NTCRM of example 1 and/or some other example herein, wherein the minimum number of beams indicates a minimum number of beams that the UE is capable of measuring per cell, per radio access technology (RAT), per frequency range, or in total number.

Example 12 may include the one or more NTCRM of example 1 and/or some other example herein, wherein the first number has an upper bound to indicate a maximum number of beams that the UE reports per cell, per radio access technology (RAT), per frequency range, or in total number.

Example 13 may include the one or more NTCRM of example 1 and/or some other example herein, wherein a number of the received plurality of beams is less than the minimum number of the beams, and to measure the at least the minimum number of the beams is to measure the received plurality of beams.

Example 14 may include the one or more NTCRM of example 1 and/or some other example herein, wherein, upon execution, the instructions are further to cause the UE to transmit the message to an access node (AN) associated with a serving cell.

Example 15 may include the one or more NTCRM of example 1 and/or some other example herein wherein the minimum number of beams indicates a minimum number of beams that the UE is capable of monitoring and the at least the minimum number of beams are configured on a serving carrier frequency of the UE.

Example 16 may include the one or more NTCRM of example 1 and/or some other example herein, wherein the at least the minimum number of beams are transmitted by an access node (AN) associated with a serving cell and are configured with carrier frequencies other than a serving carrier frequency of the UE in a same band of the serving carrier frequency, further wherein the minimum number of beams indicate a minimum number of beams that the UE is capable of monitoring.

Example 17 may include one or more NTCRM, comprising instructions to, upon execution of the instructions by one or more processors of a user equipment (UE), cause the UE to measure, based on reception of a plurality of beams, at least a minimum number of beams of the plurality of beams, wherein the minimum number of beams indicates a minimum number of beams that the UE is capable of monitoring; and generate, based on the measurements, a message to include a report of a number of the measured values that correspond to a first number of the measured beams.

Example 18 may include one or more NTCRM, comprising instructions to, upon execution of the instructions by one or more processors of an access node (AN) associated with a serving cell, cause the AN to: generate a message to indicate a maximum number of beams that a user equipment (UE) reports; transmit the message to the UE; and process, based on reception of a message from the UE, a report of a number of processed values that correspond to no more than the maximum number of beams.

Example 19 may include the one or more NTCRM of example 18 and/or some other example herein, wherein, upon execution, the instructions further cause the AN to generate a plurality of beams that include reference signals configured with carrier frequencies other than a serving carrier frequency.

Example 20 may include the one or more NTCRM of example 19 and/or some other example herein, wherein the generated beams includes respective reference signals (RSs) with respective RS indexes.

Example 21 may include an apparatus, to: measure, based on reception of a plurality of beams, at least a minimum number of beams of the plurality of beams; process, based on the measurements of the at least minimum number of beams, measured values that correspond to the measured beams; and generate, based on the processed values, a message to include a report of a number of the processed values that correspond to a first number of the measured beams.

Example 22 may include the apparatus of example 21 and/or some other example herein, wherein to measure the at least the minimum number of beams is to measure reference signals of the at least the minimum number of beams and each reference signal (RS) of the reference signals carries a specific RS index to indicate a specific beam of the at least the minimum number of beams.

Example 23 may include the apparatus of example 22 and/or some other example herein, wherein the reference signals include new radio synchronization signals (NR SSs) and each NR SS of the NR SSs includes one or more synchronization signal blocks (SSBs) with a specific SSB index that indicates a specific beam of the at least the minimum number of beams.

Example 24 may include the apparatus of example 22 and/or some other example herein, wherein the reference signals include channel state information reference signals (CSI-RSs) and each CSI-RS of the CSI-RSs includes a CSI-RS index that indicates a specific beam of the at least the minimum number of beams.

Example 25 may include the apparatus of example 21 and/or some other example herein, wherein the minimum number of beams indicates a minimum number of beams that a UE is capable of measuring and the at least the minimum number of beams are configured on a serving carrier frequency of the UE.

Example 26 may include the apparatus of example 25 and/or some other example herein, wherein the at least the minimum number of beams are transmitted by one or more access nodes (ANs) associated with one or more cells.

Example 27 may include the apparatus of example 21 and/or some other example herein, wherein the at least the minimum number of beams are transmitted by an access node (AN) associated with a serving cell and are configured with carrier frequencies other than a serving carrier frequency of a UE in a same band of the serving carrier frequency, further wherein the minimum number of beams indicate a minimum number of beams that the UE is capable of measuring.

Example 28 may include the apparatus of example 21 and/or some other example herein, wherein the first number has an upper bound to indicate a maximum number of beams, to which the processed values correspond are to be reported.

Example 29 may include the apparatus of example 28 and/or some other example herein, further to determine the maximum number of beams based on a received message from an access node (AN) associated with a serving cell that includes information to indicate the maximum number of beams.

Example 30 may include the apparatus of example 21 and/or some other example herein, wherein the measurement is to measure reference signal received power (RSRP), reference signal received quality (RSRQ), or signal to interference-and-noise ratio (SINK).

Example 31 may include the apparatus of example 21 and/or some other example herein, wherein the minimum number of beams indicates a minimum number of beams that a UE is capable of measuring per cell, per radio access technology (RAT), per frequency range, or in total number.

Example 32 may include the apparatus of example 21 and/or some other example herein, wherein the first number has an upper bound to indicate a maximum number of beams that a UE reports per cell, per radio access technology (RAT), per frequency range, or in total number.

Example 33 may include the apparatus of example 21 and/or some other example herein, wherein a number of the received plurality of beams is less than the minimum number of the beams, and to measure the at least the minimum number of the beams is to measure the received plurality of beams.

Example 34 may include the apparatus of example 21 and/or some other example herein, wherein, upon execution, the instructions are further to cause the UE to transmit the message to an access node (AN) associated with a serving cell.

Example 35 may include the apparatus of example 21 and/or some other example herein wherein the minimum number of beams indicates a minimum number of beams that a UE is capable of monitoring and the at least the minimum number of beams are configured on a serving carrier frequency of the UE.

Example 36 may include the apparatus of example 21 and/or some other example herein, wherein the at least the minimum number of beams are transmitted by an access node (AN) associated with a serving cell and are configured with carrier frequencies other than a serving carrier frequency of the UE in a same band of the serving carrier frequency, further wherein the minimum number of beams indicate a minimum number of beams that the UE is capable of monitoring.

Example 37 may include an apparatus, to: measure, based on reception of a plurality of beams, at least a minimum number of beams of the plurality of beams, wherein the minimum number of beams indicates a minimum number of beams that a UE is capable of monitoring; and generate, based on the measurements, a message to include a report of a number of the measured values that correspond to a first number of the measured beams.

Example 38 may include an apparatus of an access node (AN) associated with a serving cell, to: generate a message to indicate a maximum number of beams that a user equipment (UE) reports; transmit the message to the UE; and process, based on reception of a message from the UE, a report of a number of processed values that correspond to no more than the maximum number of beams.

Example 39 may include the apparatus of example 38 and/or some other example herein, further to generate a plurality of beams that include reference signals configured with carrier frequencies other than a serving carrier frequency.

Example 40 may include the apparatus of example 39 and/or some other example herein, wherein the generated beams include respective reference signals (RSs) with respective RS indexes.

Example 41 may include a method comprising: measuring or causing to measure, based on reception of a plurality of beams, at least a minimum number of beams of the plurality of beams; processing or causing to process, based on the measurements of the at least minimum number of beams, measured values that correspond to the measured beams; and generating or causing to generate, based on the processed values, a message to include a report of a number of the processed values that correspond to a first number of the measured beams.

Example 42 may include the method of example 41 and/or some other example herein, wherein measuring or causing to measure the at least the minimum number of beams is to measure reference signals of the at least the minimum number of beams and each reference signal (RS) of the reference signals carries a specific RS index to indicate a specific beam of the at least the minimum number of beams.

Example 43 may include the method of example 42 and/or some other example herein, wherein the reference signals include new radio synchronization signals (NR SSs) and each NR SS of the NR SSs includes one or more synchronization signal blocks (SSBs) with a specific SSB index that indicates a specific beam of the at least the minimum number of beams.

Example 44 may include the method of example 42 and/or some other example herein, wherein the reference signals include channel state information reference signals (CSI-RSs) and each CSI-RS of the CSI-RSs includes a CSI-RS index that indicates a specific beam of the at least the minimum number of beams.

Example 45 may include the method of example 41 and/or some other example herein, wherein the minimum number of beams indicates a minimum number of beams that a UE is capable of measuring and the at least the minimum number of beams are configured on a serving carrier frequency of the UE.

Example 46 may include the method of example 45 and/or some other example herein, wherein the at least the minimum number of beams are transmitted by one or more access nodes (ANs) associated with one or more cells.

Example 47 may include the method of example 41 and/or some other example herein, wherein the at least the minimum number of beams are transmitted by an access node (AN) associated with a serving cell and are configured with carrier frequencies other than a serving carrier frequency of a UE in a same band of the serving carrier frequency, further wherein the minimum number of beams indicate a minimum number of beams that the UE is capable of measuring.

Example 48 may include the method of example 41 and/or some other example herein, wherein the first number has an upper bound to indicate a maximum number of beams, to which the processed values correspond are to be reported.

Example 49 may include the method of example 48 and/or some other example herein, further comprising determining or causing to determine the maximum number of beams based on a received message from an access node (AN) associated with a serving cell that includes information to indicate the maximum number of beams.

Example 50 may include the method of example 41 and/or some other example herein, wherein the measurement is to measure reference signal received power (RSRP), reference signal received quality (RSRQ), or signal to interference-and-noise ratio (SINK).

Example 51 may include the method of example 41 and/or some other example herein, wherein the minimum number of beams indicates a minimum number of beams that a UE is capable of measuring per cell, per radio access technology (RAT), per frequency range, or in total number.

Example 52 may include the method of example 41 and/or some other example herein, wherein the first number has an upper bound to indicate a maximum number of beams that a UE reports per cell, per radio access technology (RAT), per frequency range, or in total number.

Example 53 may include the method of example 41 and/or some other example herein, wherein a number of the received plurality of beams is less than the minimum number of the beams, and to measure the at least the minimum number of the beams is to measure the received plurality of beams.

Example 54 may include the method of example 41 and/or some other example herein, further comprising transmitting or causing to transmit the message to an access node (AN) associated with a serving cell.

Example 55 may include the method of example 41 and/or some other example herein wherein the minimum number of beams indicates a minimum number of beams that a UE is capable of monitoring and the at least the minimum number of beams are configured on a serving carrier frequency of the UE.

Example 56 may include the method of example 41 and/or some other example herein, wherein the at least the minimum number of beams are transmitted by an access node (AN) associated with a serving cell and are configured with carrier frequencies other than a serving carrier frequency of a UE in a same band of the serving carrier frequency, further wherein the minimum number of beams indicate a minimum number of beams that the UE is capable of monitoring.

Example 57 may include a method comprising: measuring or causing to measure, based on reception of a plurality of beams, at least a minimum number of beams of the plurality of beams, wherein the minimum number of beams indicates a minimum number of beams that a UE is capable of monitoring; and generating or causing to generate, based on the measurements, a message to include a report of a number of measured values that correspond to a first number of the measured beams.

Example 58 may include a method comprising: generating or causing to generate a message to indicate a maximum number of beams that a user equipment (UE) reports; transmitting or causing to transmit the message to the UE; and processing or causing to process, based on reception of a message from the UE, a report of a number of processed values that correspond to no more than the maximum number of beams.

Example 59 may include the method of example 58 and/or some other example herein, further comprising generating or causing to generate a plurality of beams that include reference signals configured with carrier frequencies other than a serving carrier frequency.

Example 60 may include the method of example 59 and/or some other example herein, wherein the generated beams includes respective reference signals (RSs) with respective RS indexes.

Example 61 may include an apparatus comprising means to perform one or more elements of a method described in or related to any of examples 41-60, or any other method or process described herein.

Example 62 may include one or more non-transitory computer-readable media comprising instructions to cause an electronic device, upon execution of the instructions by one or more processors of the electronic device, to perform one or more elements of a method described in or related to any of examples 41-60, or any other method or process described herein.

Example 63 may include an apparatus comprising logic, modules, and/or circuitry to perform one or more elements of a method described in or related to any of examples 41-60, or any other method or process described herein.

Example 64 may include a method, technique, or process as described in or related to any of examples 41-60, or portions or parts thereof.

Example 65 may include an apparatus comprising: one or more processors and one or more computer-readable media comprising instructions that, when executed by the one or more processors, cause the one or more processors to perform the method, techniques, or process as described in or related to any of examples 41-60, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory computer-readable media (NTCRM) comprising instructions to, upon execution of the instructions by one or more processors of a user equipment (UE), cause the UE to:
   measure, based on reception of a plurality of beams, a first number of beams of the plurality of beams, wherein the first number is at least a minimum number, and wherein the minimum number is greater than one;
   process, based on the measurements of the first number of beams, measured values that correspond to the measured first number of beams;
   receive an indicator of a maximum number of beams to report; and
   generate, based on the processed measured values and the indicated maximum number of beams to report, a message to include a report of a subset of the processed measured values that correspond to a second number of the measured first number of beams, wherein the second number is less than the first number and is equal to or less than the maximum number of beams to report.

2. The one or more NTCRM of claim 1, wherein to measure the at first number of beams is to measure reference signals of the first number of beams, wherein each reference signal (RS) of the reference signals carries a specific RS index to indicate a specific beam of the at least the minimum number of beams.

3. The one or more NTCRM of claim 2, wherein the reference signals include new radio synchronization signals (NR SSs) and each NR SS of the NR SSs includes one or more synchronization signal blocks (SSBs) with a specific SSB index that indicates a specific beam of the first number of beams.

4. The one or more NTCRM of claim 2, wherein the reference signals include channel state information reference signals (CSI-RSs) and each CSI-RS of the CSI-RSs includes a CSI-RS index that indicates a specific beam of the first number of beams.

5. The one or more NTCRM of claim 1, wherein the minimum number is configured with a serving carrier frequency.

6. The one or more NTCRM of claim 5, wherein the first number of beams are transmitted by one or more access nodes (ANs) associated with one or more cells.

7. The one or more NTCRM of claim 1, wherein the first number of beams are transmitted by an access node (AN) associated with a serving cell and are configured with carrier frequencies other than a serving carrier frequency of the UE in a same band of the serving carrier frequency.

8. The one or more NTCRM of claim 1, wherein the indication of the maximum number of beams to report is received from an access node (AN) associated with a serving cell.

9. The one or more NTCRM of claim 1, wherein to measure the first number of beams of the plurality of beams, the UE is to measure reference signal received power (RSRP), reference signal received quality (RSRQ), or signal to interference-and-noise ratio (SINR).

10. The one or more NTCRM of claim 1, wherein the minimum number indicates a minimum number of beams that the UE is capable of measuring per cell, per radio access technology (RAT), per frequency range, or in total number.

11. The one or more NTCRM of claim 1, wherein the maximum number corresponds to a maximum number of beams that the UE reports per cell, per radio access technology (RAT), per frequency range, or in total number.

12. The one or more NTCRM of claim 1, wherein, upon execution, the instructions are further to cause the UE to transmit the message to an access node (AN) associated with a serving cell.

13. The one or more NTCRM of claim 1, wherein the first number of beams is less than a quantity of the plurality of beams.

14. An apparatus of a user equipment (UE), comprising:
   memory to store beam information for a plurality of beams; and
   processing circuitry to:
     measure, based on reception of the plurality of beams, a first number of beams of the plurality of beams, wherein the first number is at least a minimum number, wherein the minimum number is greater than one, and wherein the minimum number indicates a minimum number of beams that the UE is capable of monitoring;
     receive, from an access node (AN) associated with a serving cell, an indicator of a maximum number of beams to report; and
     generate, based on the measurements, a message to include a report of measured values that correspond to a second number of the measured beams, wherein the second number is less than the first number and is equal to or less than the maximum number of beams to report.

15. The apparatus of claim 14, wherein each beam of the first number of beams includes a reference signal (RS) that carries a specific synchronization signal block (SSB) index or an RS index to indicate the each beam.

16. The apparatus of claim 14, wherein the first number of beams is less than a quantity of the plurality of beams.

* * * * *

UNITED STATES PATENT AND TRADEMARK OFFICE
CERTIFICATE OF CORRECTION

PATENT NO.         : 11,108,476 B2                                           Page 1 of 1
APPLICATION NO.    : 16/163004
DATED              : August 31, 2021
INVENTOR(S)        : Yiu et al.

It is certified that error appears in the above-identified patent and that said Letters Patent is hereby corrected as shown below:

In the Claims

Column 21
Line 48, take "at" out after "measure the" and before "first number".

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*